April 6, 1926.                          1,579,797
C. W. N. SORENSEN
VEHICLE AND LIKE SPRING
Filed June 4, 1923
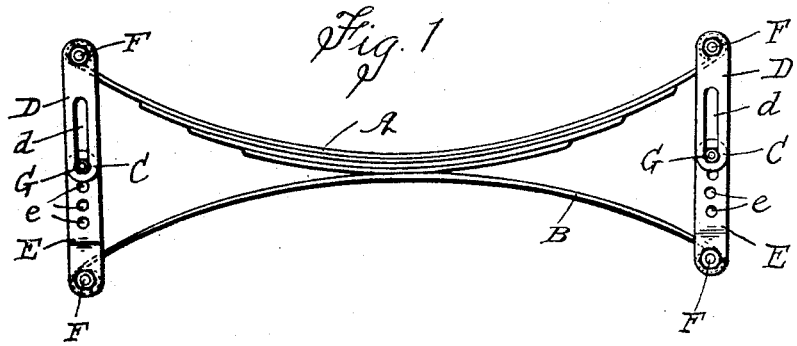
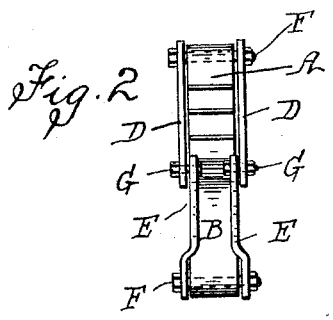
Inventor:
Charles Waldemar Norman Sorensen
By [signature]
Attorney Patented Apr. 6, 1926.

1,579,797

UNITED STATES PATENT OFFICE.

CHARLES WALDERMAR NORMAN SORENSEN, OF HAMILTON, NEW ZEALAND.

VEHICLE AND LIKE SPRING.

Application filed June 4, 1923. Serial No. 643,358.

*To all whom it may concern:*

Be it known that I, CHARLES WALDERMAR NORMAN SORENSEN, subject of the King of Great Britain, residing at Brookfield Street, Hamilton, Dominion of New Zealand, have invented new and useful Improvements in Vehicle and like Springs, of which the following is a specification.

This invention has reference to the ordinary types of semi-elliptical, or bow, springs used in vehicle constructions of all kinds and especially in the suspension of the body upon the underframing. The object of the invention is to provide a shock absorbing attachment to such a form of spring that will act in opposition thereto to cushion the bending actions of the spring caused by the usual running conditions.

The invention consists in the combination with the ordinary bowed spring, of a separate spring, formed preferably by a single leaf, bent lengthwise in opposition to the bow of the main spring and laid on such main spring so that the two extend longitudinally with one another and have their ends coupled together by shackle joints of special design such as to provide for the spring attachment being tensioned in relation to the main spring.

The said shackle connections are so disposed that they extend vertically from each main spring end to the corresponding end of the attachment spring, and by being swivelled thereto, allow of the main spring performing its usual functions, and for its bending strains being countersprung by the opposing bow of the attachment spring.

The invention is illustrated in the accompanying drawings, in which:—

Figure 1 is an elevation of an ordinary spring showing the attachment secured thereon.

Figure 2 is an end elevation thereof.

A represents an ordinary spring made up of any desired number of leaves arranged in the usual manner and clamped together with the ordinary means employed in the construction of the springs.

B is the bow spring attachment that is curved in opposition to the curve of the main spring and is arranged so that the top of its bow engages the top of that of the main spring. This spring B is secured at each end to the corresponding end of the main spring A by means of the shackles C extending vertically between such ends.

The shackles are made in two members, each composed of two plates D and E arranged to overlap one another in the same longitudinal line and at their respective outer extremities to extend across the side faces of the two spring ends. The ends of these plates on the one side of the springs are then connected to the corresponding ends of the plates on the other side, by means of bolts F passing through them and through the usual eyes formed in the spring ends. The overlapped portions of the plates D and E on each side are bolted together by means of the bolt G passing through them, so that the shackle member thus formed, constitutes a rigid whole, and with the member on the other side forms the complete connection between the spring ends. This connection is such as to permit of the spring working freely in the ordinary manner for which it is constructed.

The shackles C, connecting the spring ends together in the manner described, will thus tension the bearing of the spring B upon the spring A so that it will act as a counter-spring thereto. The degree of the tension is made variable by the manner of constructing the shackle members hereinbefore described, as each member's length may be varied at will to bring the spring ends more or less together. To provide for this variation in length being readily effected, the plate D is formed with a longitudinal slot $d$, and the plate E with bolt holes $e$ at different intervals in its length, through which the bolt G passes, so that the amount of overlap may be varied to any amount provided by these features.

The spring B is made preferably so that its strength towards its middle increases from both ends in the well known principle, and thus to improve its springiness and responsiveness in its action to stabilize the actions of the main spring. This may be done by increasing the thickness of the single leaf, as shown in Figure 1, or by adding extra leaves in the well known method of spring construction.

I claim:—

In a vehicle spring, the combination of a main bow spring, an auxiliary spring bowed in opposition to the main spring, said springs having their bows directly contacting with each other at their centers, and a pair of shackles connecting the corresponding ends of the springs together; each shackle comprising two pairs of spaced plates between the outer ends of which the free ends of the springs are arranged, the plates of one pair being formed with oppositely-located longitudinal slots and having their inner ends overlapping those of the plates of the other pair, the said other pair of plates being formed with a longitudinal series of oppositely-located holes, end bolts connecting the outer ends of the plates and to which the ends of the springs are attached, and a central bolt interchangeably engaged in said holes and projecting at its ends through said slots to adjustably connect the overlapping inner ends of the plates and thereby vary the tension of the bearing of the auxiliary spring upon the main spring.

In testimony whereof, I affix my signature.

CHARLES WALDERMAR NORMAN SORENSEN.